United States Patent
Okita

(10) Patent No.: US 12,510,429 B2
(45) Date of Patent: Dec. 30, 2025

(54) DIFFERENTIAL PRESSURE MEASURING DEVICE AND DIFFERENTIAL PRESSURE MEASUREMENT METHOD

(71) Applicant: SUMCO CORPORATION, Tokyo (JP)

(72) Inventor: Kenji Okita, Tokyo (JP)

(73) Assignee: SUMCO CORPORATION, Tokyo (JP)

( * ) Notice: Subject to any disclaimer, the term of this patent is extended or adjusted under 35 U.S.C. 154(b) by 273 days.

(21) Appl. No.: 18/252,473

(22) PCT Filed: Oct. 19, 2021

(86) PCT No.: PCT/JP2021/038654
§ 371 (c)(1),
(2) Date: May 10, 2023

(87) PCT Pub. No.: WO2022/102358
PCT Pub. Date: May 19, 2022

(65) Prior Publication Data
US 2023/0408356 A1  Dec. 21, 2023

(30) Foreign Application Priority Data

Nov. 12, 2020  (JP) ................... 2020-188946

(51) Int. Cl.
*G01L 13/00* (2006.01)
*F24F 3/167* (2021.01)
(Continued)

(52) U.S. Cl.
CPC .............. *G01L 13/00* (2013.01); *F24F 3/167* (2021.01); *F24F 11/30* (2018.01); *G01L 19/14* (2013.01); *F24F 2110/40* (2018.01); *G01L 15/00* (2013.01)

(58) Field of Classification Search
CPC ......... G01L 13/00; G01L 19/14; G01L 15/00; F24F 3/167; F24F 11/30; F24F 2110/40
See application file for complete search history.

(56) References Cited

U.S. PATENT DOCUMENTS

| | | |
|---|---|---|
| 9,121,738 B2 | 9/2015 | Sano et al. |
| 2003/0157882 A1 | 8/2003 | Boulanger et al. |
| (Continued) | | |

FOREIGN PATENT DOCUMENTS

| | | |
|---|---|---|
| CN | 109668677 | 4/2019 |
| JP | 7-174777 | 7/1995 |
| (Continued) | | |

OTHER PUBLICATIONS

International Search Report issued in International Patent Application No. PCT/JP2021/038654, dated Dec. 28, 2021, along with an English translation thereof.

(Continued)

*Primary Examiner* — Benjamin R Schmitt
(74) *Attorney, Agent, or Firm* — Greenblum & Bernstein, P.L.C.

(57) ABSTRACT

A differential pressure measuring device and a differential pressure measurement method that can measure the difference between the pressure in an on-floor area and the pressure in an under-floor area even when the differential pressure is small. The device includes a differential pressure measuring unit, a first pipe of which one end is connected to a first port, and a second pipe of which one end is connected to a second port; and a cup to which the other end of the second pipe is connected and which forms a space for measuring the pressure in the under-floor area on the grating floor plate. The distance in a device height direction between the other end of the first pipe and the other end of the second pipe is fixed.

20 Claims, 5 Drawing Sheets

(51) Int. Cl.
  *F24F 11/30*   (2018.01)
  *G01L 19/14*   (2006.01)
  *F24F 110/40*  (2018.01)
  *G01L 15/00*   (2006.01)

(56) References Cited

U.S. PATENT DOCUMENTS

| | | | | |
|---|---|---|---|---|
| 2006/0003684 | A1* | 1/2006 | Hwang | F24F 13/068 |
| | | | | 454/186 |
| 2007/0171086 | A1* | 7/2007 | Belady | H05K 7/20836 |
| | | | | 340/665 |
| 2012/0295530 | A1 | 11/2012 | Ikeno et al. | |
| 2013/0340535 | A1 | 12/2013 | Sano et al. | |
| 2020/0166235 | A1 | 5/2020 | Marra et al. | |

FOREIGN PATENT DOCUMENTS

| | | | |
|---|---|---|---|
| JP | 11-118649 | 4/1999 | |
| JP | 11-218353 | 8/1999 | |
| JP | 2002-257392 | 9/2002 | |
| JP | 2004-218919 | 8/2004 | |
| JP | 2007-220773 | 8/2007 | |
| JP | 2009-183853 | 8/2009 | |
| JP | 2009-270752 | 11/2009 | |
| JP | 2012-241961 | 12/2012 | |
| JP | 2014-5996 | 1/2014 | |
| WO | WO-0109555 A1 * | 2/2001 | F24F 3/044 |

OTHER PUBLICATIONS

International Preliminary Report on Patentability issued in International Patent Application No. PCT/JP2021/038654, dated May 16, 2023, along with an English translation thereof.

Office Action issued in Corresponding JP Patent Application No. 2020-188946, dated Aug. 29, 2023, along with an English translation thereof.

Office Action issued in Corresponding CN Patent Application No. 202180075710.9, dated Jun. 10, 2025, along with an English translation thereof.

"Automotive Testing Technology ($2^{nd}$ Edition)," Beijing Institute of Technology Press (2015), ISBN 978-7-5640-7572-9, pp. 195-198, along with an English translation thereof.

Office Action issued in Corresponding CN Patent Application No. 202180075710.9, dated Oct. 17, 2025, along with an English translation thereof.

* cited by examiner

DIFFERENTIAL PRESSURE MEASURING DEVICE AND DIFFERENTIAL PRESSURE MEASUREMENT METHOD

TECHNICAL FIELD

This disclosure relates to a differential pressure measuring device and a differential pressure measurement method.

BACKGROUND

Semiconductor devices have conventionally been produced in clean rooms configured to meet predetermined standards of the rooms' cleanliness. Typical clean rooms currently used employ a circulating downflow system in which after clean air is supplied from a ceiling area toward an underfloor area and the air in the underfloor area is recovered and cleaned, the recovered air is guided to the ceiling area and resupplied to the underfloor area.

FIG. 1 presents a schematic view of an example of a circulating downflow clean room. In a cleanroom 100 depicted in FIG. 1, a clean air supply unit 101 supplying clean air, such as a fan filter unit (FFU) is placed on a ceiling area 100a. Further, grating floor plates 102 having a plurality of openings 102a are placed in the floor 100b.

For the supply of clean air, there are a full downflow system in which clean air is supplied from the entire surface of the ceiling area 100a, and a partial downflow system in which clean air is supplied from part of the ceiling area 100a (partial downflow system is illustrated as an example in FIG. 1). Further, the placement of the grating floor plates 102 may be a placement on either the entire surface of the floor or part of the floor (placement on part of the floor in FIG. 1).

Further, in the floor area 100d of the cleanroom 100, a return port 103 through which air discharged to the under-floor area 100d is recovered is provided on each of a pair of opposite walls when the cleanroom 100 is viewed from above or at one or more positions on the entire walls.

In such a cleanroom 100, clean air supplied from the clean air supply unit 101 passes through an on-floor area 100c and is discharged to the under-floor area 100d through the openings 102a provided in the grating floor plate 102. The discharged air is recovered through the return port 103, and then cleaned through a filter (not shown) and guided to the ceiling area 100a by a blast fan 104. The clean air is then resupplied by the clean air supply unit 101 toward the under-floor area 100d. Thus, the clean room is configured such that clean air is circulated between the ceiling area 100a and the under-floor area 100d.

In the thus configured clean room 100, the pressure in the on-floor area 100c is a relatively high positive pressure, and the pressure in the under-floor area 100d is a relatively low negative pressure. This allows the air to flow from above to below, which inhibits particles from being diffused upward.

In the above clean room 100, the air volume of the clean air is not uniform in the entire area of the on-floor area 100c, and is higher closer to the return port 103, whereas the air volume is lower away from the return port 103. In the clean room 100, the air volume of the clean air is preferably uniform in the entire area of the on-floor area 100c. Accordingly, the air volume of the clean air needs to be controlled to be uniform by controlling the supply amount of the air from the clean air supply unit 101, the aperture ratio of the openings 102a in the grating floor plate 102, or the like.

In controlling the air volume of the clean air, the control is performed using the differential pressure between the pressure in the on-floor area 100c and the pressure in the under-floor area 100d as an indication. For example, JP 2004-218919 A (PTL 1) discloses a method of controlling the flow rate of clean air based on the differential pressure between the pressure in the on-floor area 100c and the pressure in the under-floor area 100d measured by acquiring the pressure in the on-floor area 100c using one of two ports of a differential pressure measuring device (manometer) and acquiring the pressure in the under-floor area 100d using the other port.

CITATION LIST

Patent Literature

PTL 1: JP 2004-218919 A

SUMMARY

Technical Problem

However, it was found for the method disclosed in PTL 1 that although the differential pressure could be accurately measured when the differential pressure was large, the differential pressure could not accurately be measured when the differential pressure was small (for example, the order of 0.1 Pa).

This disclosure has been made in view of the above problem, and it could be helpful to provide a differential pressure measuring device and a differential pressure measurement method that make it possible to accurately measure the differential pressure between the pressure in an on-floor area and the pressure in an under-floor area even when the differential pressure is small.

Solution to Problem

We propose the following features to solve the above problem.

[1] A differential pressure measuring device measuring a differential pressure between a pressure in an on-floor area in a room in which a grating floor plate is placed and a pressure in an under-floor area in the room, comprising:
  a differential pressure measuring unit having a first port acquiring a pressure in the on-floor area, a second port acquiring a pressure in the under-floor area, a first pipe of which one end is connected to the first port, and a second pipe of which one end is connected to the second port; and
  a cup to which the other end of the second pipe is connected and which forms a space for measuring the pressure in the under-floor area on the grating floor plate when the grating floor plate is placed,
  wherein a distance in a device height direction between the other end of the first pipe and the other end of the second pipe is fixed.

[2] The differential pressure measuring device according to [1] above, wherein the distance in the device height direction is 0 mm or more and 250 mm or less.

[3] The differential pressure measuring device according to [1] or [2] above, wherein the other end of the first pipe points in a direction crossing the device height direction.

[4] The differential pressure measuring device according to any one of [1] to [3] above, further comprising a cover inhibiting an air current from flowing to the other end of the first pipe.

[5] A differential pressure measurement method comprising:
  placing the differential pressure measuring device according to any one of [1] to [4] above on a grating floor plate placed on a floor in a room; and
  measuring a differential pressure between a pressure in an on-floor area and a pressure in an under-floor area.

Advantageous Effect

This disclosure makes it possible to measure the difference between the pressure in an on-floor area and the pressure in an under-floor area even when the differential pressure is small.

BRIEF DESCRIPTION OF THE DRAWINGS

In the accompanying drawings.

DETAILED DESCRIPTION (Differential Pressure Measuring Device)

Embodiments of a differential pressure measuring device and a differential pressure measurement method according to this disclosure will now be described with reference to the drawings. The disclosed differential pressure measuring device measuring the differential pressure between the pressure in an on-floor area in a room in which a grating floor plate is placed and the pressure in an under-floor area in the room includes: a differential pressure measuring unit having a first port acquiring a pressure in the on-floor area, a second port acquiring a pressure in the under-floor area, a first pipe of which one end is connected to the first port, and a second pipe of which one end is connected to the second port; and a cup to which the other end of the second pipe is connected and which forms a space for measuring the pressure in the under-floor area on the grating floor plate when placed on the grating floor plate. The distance in a device height direction between the other end of the first pipe and the other end of the second pipe is fixed. In other words, in the differential pressure measuring device according to this disclosure, the relative positional relationship in the device height direction between the other end of the first pipe and the other end of the second pipe is fixed and is unchanged.

As described above, in the method disclosed in PTL 1, in the case where the differential pressure between the pressure in the on-floor area 100c of the clean room 100 and the pressure in the under-floor area 100d of the room is measured using the differential pressure measuring device, when the differential pressure is small, the measurement cannot be performed with high accuracy. The present inventor diligently studied reasons the above differential pressure cannot be measured with high accuracy, and subsequently considered that air currents of clean air would have an influence on the acquisition of the pressure in the on-floor area 100c and the pressure in the under-floor area 100d.

Figure 1:
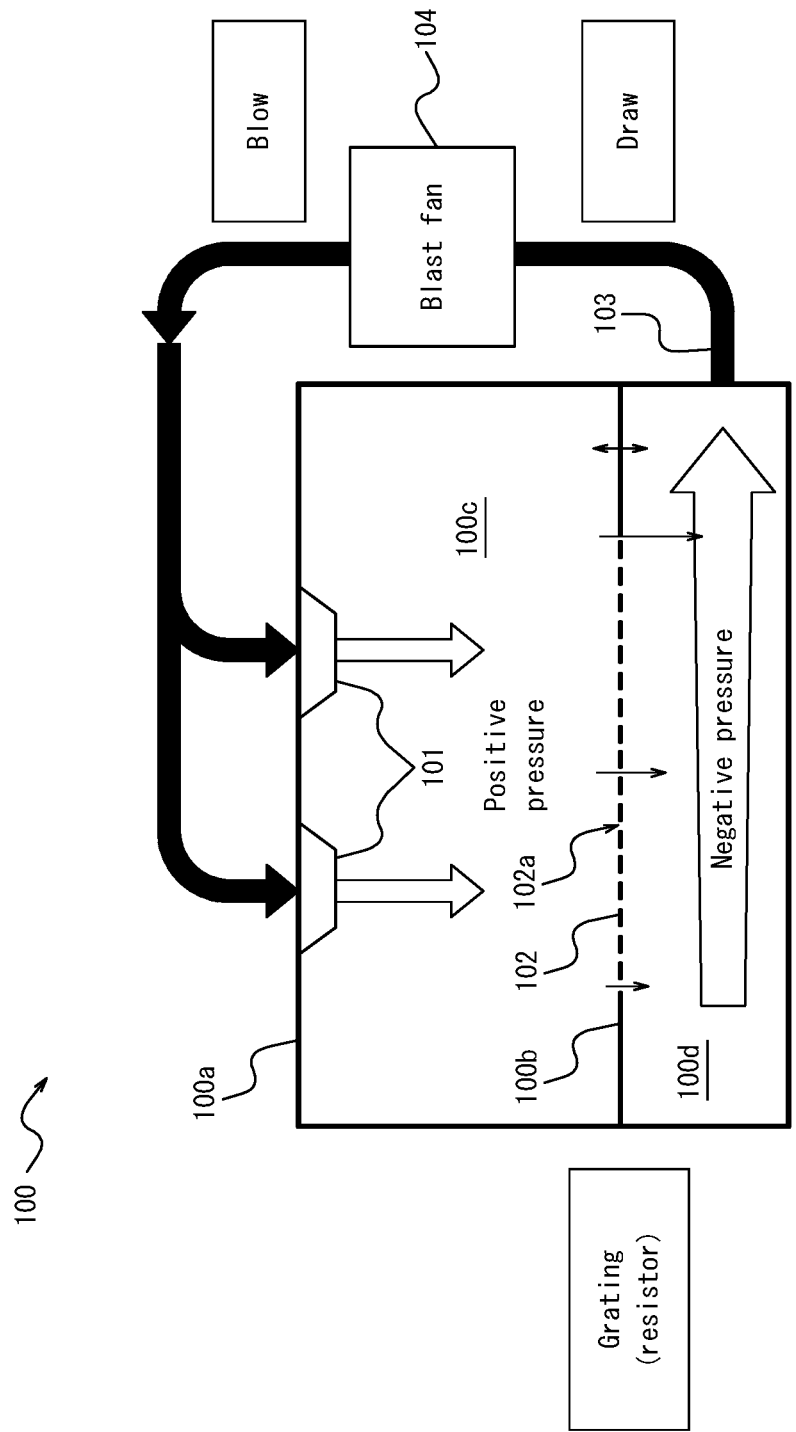
FIG. 1 is a schematic view of an example of a circulating downflow clean room.

That is, in a differential pressure measuring device, as the pressures acquired at two positions for measuring the differential pressure, the total pressure that is the sum of the static pressure that is the pressure of the air and the dynamic pressure that is obtained by converting the kinetic energy of the air to a pressure is measured. In the clean room 100 depicted in FIG. 1, clean air in the on-floor area 100c locally passes through the openings 102a in the partly placed grating floor plates 102 and flows into the under-floor area 100d. Accordingly, the flow rate of the air is higher under the grating floor plates 102. Thus, in the method disclosed in PTL 1, since the port acquiring the pressure in the under-floor area 100d is placed in the under-floor area 100d under the grating floor plate 102, the pressure in the under-floor area 100d to be acquired is greatly affected by the dynamic pressure.

However, what is required to control the air currents of clean air in the clean room 100 is the differential pressure between the static pressure in the on-floor area 100c and the static pressure in the under-floor area 100d. This being the case, the present inventor diligently studied ways to reduce the influence of the dynamic pressure as described above in acquiring the pressure in the under-floor area 100d. In the study, the inventor conceived of connecting a cup to one end of the pipe having the other end connected to the port acquiring the pressure in the under-floor area 100d in the differential pressure measuring device. Further, the inventor found that when the cup is placed on the grating floor plate 102, the connection of the cup can establish a pseudo under-floor space between the cup and the grating floor plate 102, and the pressure in the under-floor area 100d can be acquired with the dynamic pressure of the clean air being reduced.

Further, the present inventor considered that in acquiring the pressure in the under-floor area 100d, when one end of a flexible pipe is connected to a port acquiring the pressure in the on-floor area 100c, the position of the other end of the pipe varies from measurement to measurement, which would lead to the variation in the values of the differential pressure. Accordingly, the present inventor conceived of fixing the distance in the device height direction between the other end of the pipe (first pipe) connected to the port acquiring the pressure in the on-floor area 100c (first port) and the other end of the pipe (second pipe) connected to the port acquiring the pressure in the under-floor area 100d (second port). Thus, this disclosure has been made. The features of the differential pressure measuring device according to this disclosure will now be described.

Figure 2:
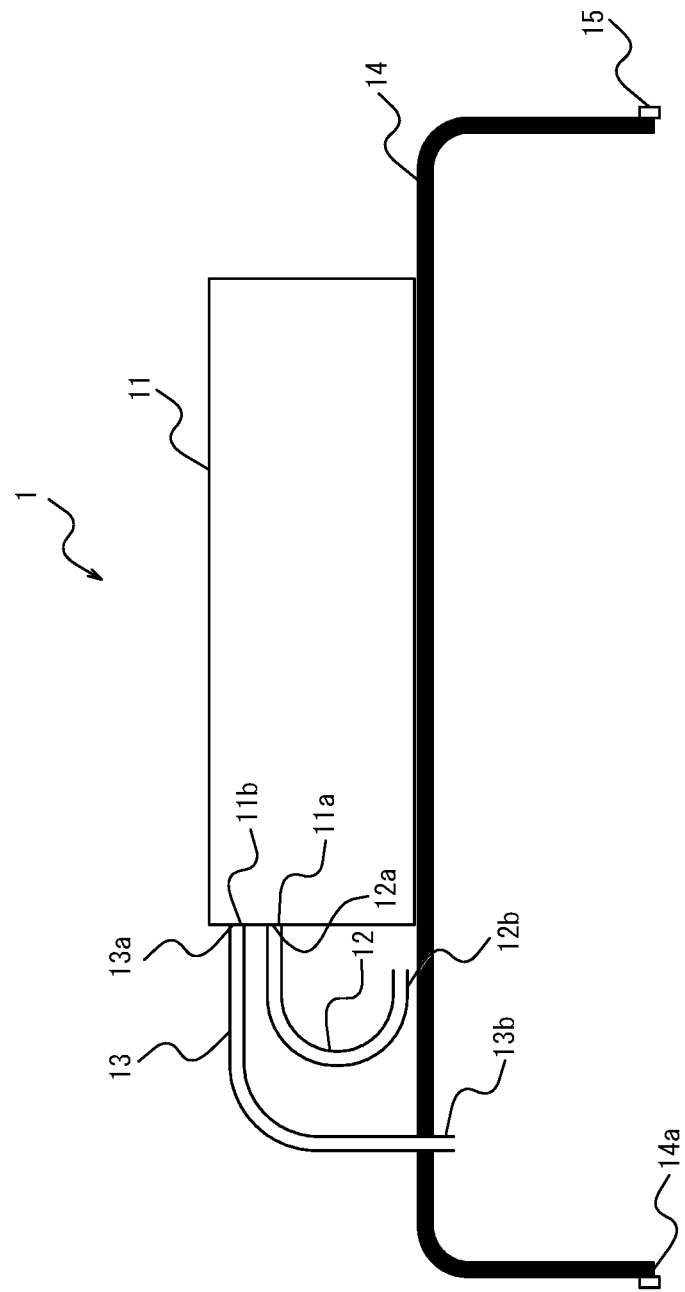
FIG. 2 is a cross-sectional view of a preferred example of a differential pressure measuring device according to this disclosure.

FIG. 2 presents a cross-sectional view of a preferred example of a differential pressure measuring device according to this disclosure. A differential pressure measuring device 1 depicted in FIG. 2 includes a differential pressure measuring unit 11, a first pipe 12, a second pipe 13, a cup 14, and a gasket 15.

The differential pressure measuring unit 11 has a first port 11a acquiring the pressure in the on-floor area 100c and a second port 11b acquiring the pressure in the under-floor area 100d. One end 12a of the first pipe 12 is connected to the first port 11a, and one end 13a of the second pipe 13 is connected to the second port 11b. The differential pressure measuring unit 11 measures the differential pressure acquired from the difference between the acquired pressure in the on-floor area 100c and the pressure in the under-floor area 100d.

The differential pressure measuring unit 11 is not limited as the pressure in the on-floor area 100c and the pressure in the under-floor area 100d can be acquired and the differential pressure between them can be measured, and may be consisted by a known existing differential pressure measuring device (manometer). Note however that since the value of the differential pressure between the pressure in the on-floor area 100c and the pressure in the under-floor area 100d in the clean room 100 is small, the differential pressure measuring unit 11 preferably has a resolution of 0.1 Pa or less. With a resolution of Pa or less, the differential pressure between the pressure in the on-floor area 100c and the pressure in the under-floor area 100d can be determined with sufficient accuracy.

The first pipe 12 and the second pipe 13 may be formed from flexible polyvinyl chloride, a silicone tube, or the like.

Figure 3:
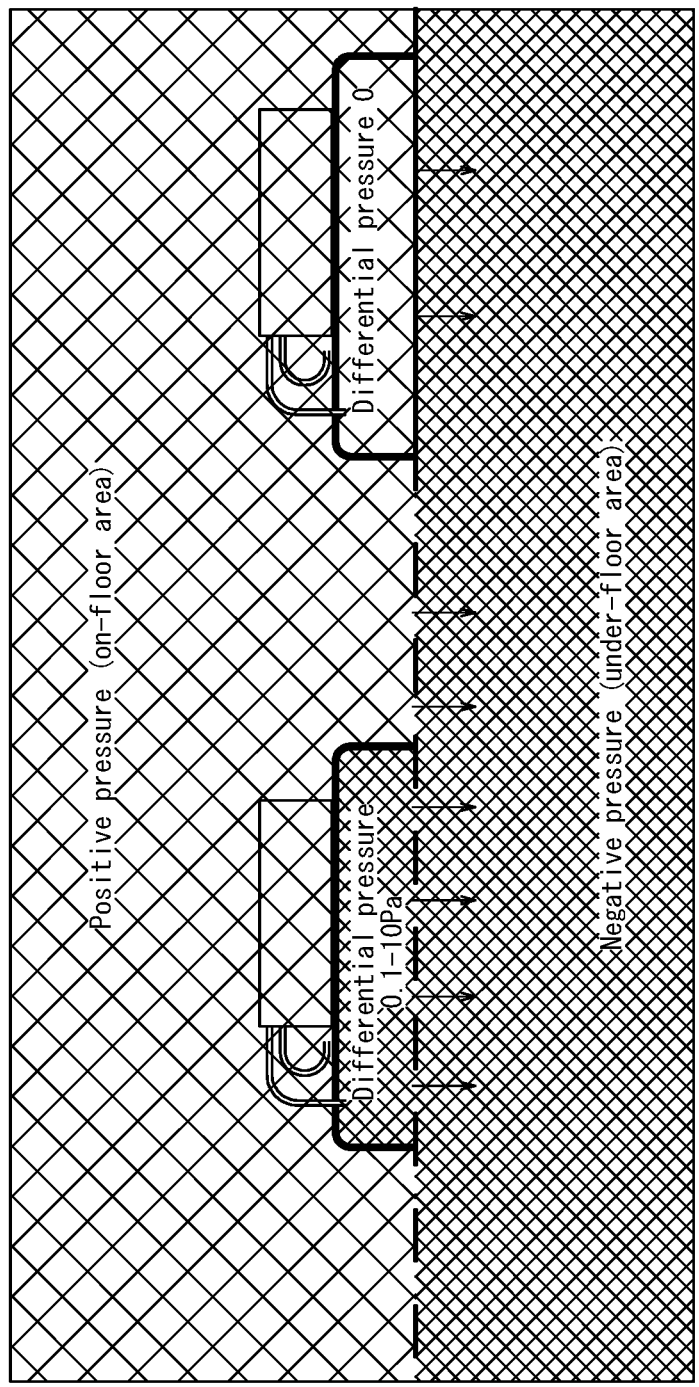
FIG. 3 is a diagram illustrating effects obtained using a differential pressure measuring device according to this disclosure.

Further, the cup 14 is connected to the other end 13b of the second pipe 13. As illustrated in FIG. 3, the cup 14 is configured such that the pseudo space of the under-floor area 100d is formed between the cup 14 and the grating floor plate 102 when the cup 14 is placed on the grating floor plate 102. With this structure, the dynamic pressure of the airflow in the under-floor area 100d is suppressed and the static pressure in the under-floor area 100d can be measured.

As illustrated in FIG. 2, the gasket 15 is preferably provided along a rim portion 14a of the cup 14. This can inhibit the air current in the on-floor area 100c from penetrating into the space between the cup 14 and the grating floor plate 102, thus making the above space a space having an environment more similar to that in the under-floor area 100d.

The cup 14 can be made of a material having a sufficient strength that does not affect the measurement of differential pressure, and may be made of for example, a resin such as polypropylene or a light metal, for example, aluminum.

Further, for the dimensions of the cup 14, both the length and the width are preferably 100 mm or more and 600 mm or less, since the size of the grating floor plate 102 is typically approximately length: 600 mm×width: 600 mm. When both the length and the width are 100 mm or more, the static pressure in the under-floor area 100d can be favorably acquired. Further, when both the length and the width are 600 mm or less, the differential pressure can be measured finely at different positions on one grating floor plate 102. The dimensions of the cup 14 are most preferred when the length is 200 mm and the width is 100 mm. Since the differential pressure may be smaller away in the direction toward the return port 103 in the under-floor area 100d, finer differential pressure distribution can be determined by placing the cap such that the lateral direction (shorter side) of the cup 14 is parallel to the return port 103 direction (see FIG. 4) with the length of the cup in the lateral direction being 100 mm. On the other hand, placing the cup such that the longitudinal direction (longer side) of the cup 14 is perpendicular to the return port 103 direction with the length of the cup 14 in the longitudinal direction being 200 mm (see FIG. 4) can increase the area of the cup 14 in a direction in which changes are small over the distance and can increase the stable measurement area, thus stabilizing the measured values. The height of the cup 14 is preferably 20 mm or more and 100 mm or less. When the height of the cup 14 is 20 mm or more, a pseudo space of the under-floor area 100d can formed inside the cup, and the static pressure in the under-floor area 100d can be measured in a stable manner. When the height of the cup 14 is 100 mm or less, the static pressure in the under-floor area 100d can be measured without sacrificing the portability.

In the differential pressure measuring device 1 having the structure as described above, it is important that the distance in the device height direction between the other end 12b of the first pipe 12 and the other end 13b of the second pipe 13 is fixed. This makes it possible to measure the differential pressure with higher accuracy. Note that "the distance in the device height direction from the other end 13b of the second pipe 13" means the difference between the height position of the other end 12b on the center axis of the first pipe 12 and the height position of the other end 13b on the center axis of the second pipe 13 when the cup 14 is placed on a level surface such that the rim portion 14a of the cup is in contact with the level surface.

Further, the positions of the other end 12b of the first pipe 12 connected to the first port 11a acquiring the pressure in the on-floor area 100c and the other end 13b of the second pipe 13 connected to the second port 11b acquiring the pressure in the under-floor area 100d are fixed in the differential pressure measuring device 1 of this disclosure.

The above distance in the device height direction between the other end 12b of the first pipe 12 and the other end 13b of the second pipe 13 is preferably 0 mm or more and 250 mm or less. This can make the measurement error of the differential pressure 0.1 Pa or less. The distance in the device height direction is more preferably 0 mm or more and 120 mm or less. This can make the measurement error of the differential pressure 0.0 Pa.

Further, the other end 12b of the first pipe 12 preferably points in a direction crossing the device height direction as illustrated in FIG. 2. As described above, to control air currents of clean air, the differential pressure between the static pressure in the on-floor area 100c and the static pressure in the under-floor area 100d needs to be measured; when the other end 12b of the first pipe 12 points in a direction crossing the device height direction, the dynamic pressure has a smaller effect in the case of acquiring the pressure in the on-floor area 100c than in the case of acquiring the pressure in the under-floor area 100d.

However, when the other end 12b of the first pipe 12 is made to point upward in the vertical direction, the clean air penetrates into the first pipe 12, which increases the effect of the dynamic pressure. Further, when the other end 12b of the first pipe 12 is made to point downward in the vertical direction, airflows reflected at a surface of the cup 14 easily penetrate into the first pipe 12, which increases the effect of the dynamic pressure.

Accordingly, the other end 12b of the first pipe 12 preferably points in a direction crossing the device height direction. As illustrated in FIG. 2, the other end 12b of the first pipe 12 more preferably points in a direction orthogonal to the device height direction.

Further, the measuring device preferably further has a cover that suppress air currents from flowing to the other end 12b of the first pipe 12. Such a cover is not limited as long as it is breathable and it can reduce the dynamic pressure by reducing the momentum of the airflow. The cover may include, for example, a porous material having numerous air bubbles, a bubbler used to supply the air for example in a water tank, a dense flocculent material, a spherical body that is made of a metal material or resin and has small through holes (for example, a diameter of 0.05 mm to 1 mm). Such a cover may be placed above the other end 12b of the first pipe 12; the above metal material may be formed into a box shape and the other end 12b of the first pipe 12 may be introduced into the cover with the box shape; or the whole of the differential pressure measuring device 1 may be received in the box-shaped cover. Alternatively, two or three box-shaped covers in which boxes having different sizes are nested may be used, and the other end 12b of the first pipe 12 or the whole of the differential pressure measuring device 1 may be placed inside the innermost one of the box-shaped covers.

Thus, using the differential pressure measuring device 1 according to this disclosure, the differential pressure can be measured with high accuracy even when the differential pressure between the pressure in the on-floor area 100c and the pressure in the under-floor area 100d is small. Further, since the differential pressure measuring device 1 according to this disclosure is excellent in portability, the differential pressure between the pressure in the on-floor area 100c and the pressure in the under-floor area 100d at different positions in the clean room 100 can be measured.

(Differential Pressure Measurement Method)

A differential pressure measurement method according to this disclosure will now be described. A differential pressure measurement method according to this disclosure includes: placing the above-described differential pressure measuring device according to this disclosure on a grating floor plate placed on a floor in a room; and measuring the differential pressure between the pressure in an on-floor area and the pressure in an under-floor area.

As described above, using the differential pressure measuring device 1 according to this disclosure, the pressure in the under-floor area 100d can be acquired in the pseudo space of the under-floor area 100d between the cup 14 and the grating floor plate 102, with the effect of the dynamic pressure being reduced. This makes it possible to measure the differential pressure between the pressure in the on-floor area 100c and the pressure in the under-floor area 100d with high accuracy even when the differential pressure between the pressure in the on-floor area 100c and the the pressure in the under-floor area 100d is small.

When the above differential pressure measuring device 1 according to this disclosure is placed on the grating floor plate 102, the rim portion 14a of the cup 14 is preferably not placed on the openings 102a in the grating floor plate 102 as much as possible, and more preferably the rim portion 14a is placed on none of the openings 102a. This makes the space between the cup 14 and the grating floor plate 102 more similar to the space of the actual under-floor area 100d.

EXAMPLES

Examples of the differential pressure measuring device and the differential pressure measurement device according to this disclosure will now be described; however, this disclosure is not limited to Examples below.

A manometer (FP-1 manufactured by SIBATA SCIENTIFIC TECHNOLOGY LTD.) was used as the differential pressure measuring unit 11 depicted in FIG. 2, and the effect of the difference between the height position of the first port 11a and the height position of the second port 11b on the differential pressure was studied. Specifically, the first pipe 12 was not connected to the first port 11a, and the one end 13a of the second pipe 13 was connected to the second port 11b. The differential pressure was measured in the cases where the height position of the other end 13b of the second pipe 13 was lower than the height position of the first port 11a by 0 mm (Reference Example 1), by 250 mm (Reference Example 2), and by 500 mm (Reference Example 3). The above measurements of differential pressure were performed with the first port 11a and the other end 13b of the second pipe 13 being placed in the on-floor area 100c. As such, the values of differential pressure were 0 Pa (Reference Example 1), 0.1 Pa (Reference Example 2), and 0.2 Pa (Reference Example 3). These results demonstrate that when the difference between the height position of the first port 11a (i.e., the other end 12b of the first pipe 12) and the height position of the other end 13b of the second pipe 13 is 0 mm or more and 250 mm or less, the differential pressure can be measured with a measurement error of 0.1 Pa, and with a measurement error of 0.0 Pa when the difference is 0 mm or more and 120 mm or less.

Invention Example

The differential pressure between the pressure in the on-floor area 100c in the clean room 100 and the pressure in the under-floor area 100d therein was measured using the differential pressure measuring device 1 depicted in FIG. 2. Specifically, a manometer (FP-1 manufactured by SIBATA SCIENTIFIC TECHNOLOGY LTD.) was used as the differential pressure measuring unit 11. Further, the first pipe 12 and the second pipe 13 were formed from a silicon tube, and the cup 14 was made of a plastic material: polypropylene. The dimensions of the cup 14 were length: 150 mm, width: 200 mm, and height: 50 mm.

Figure 4:
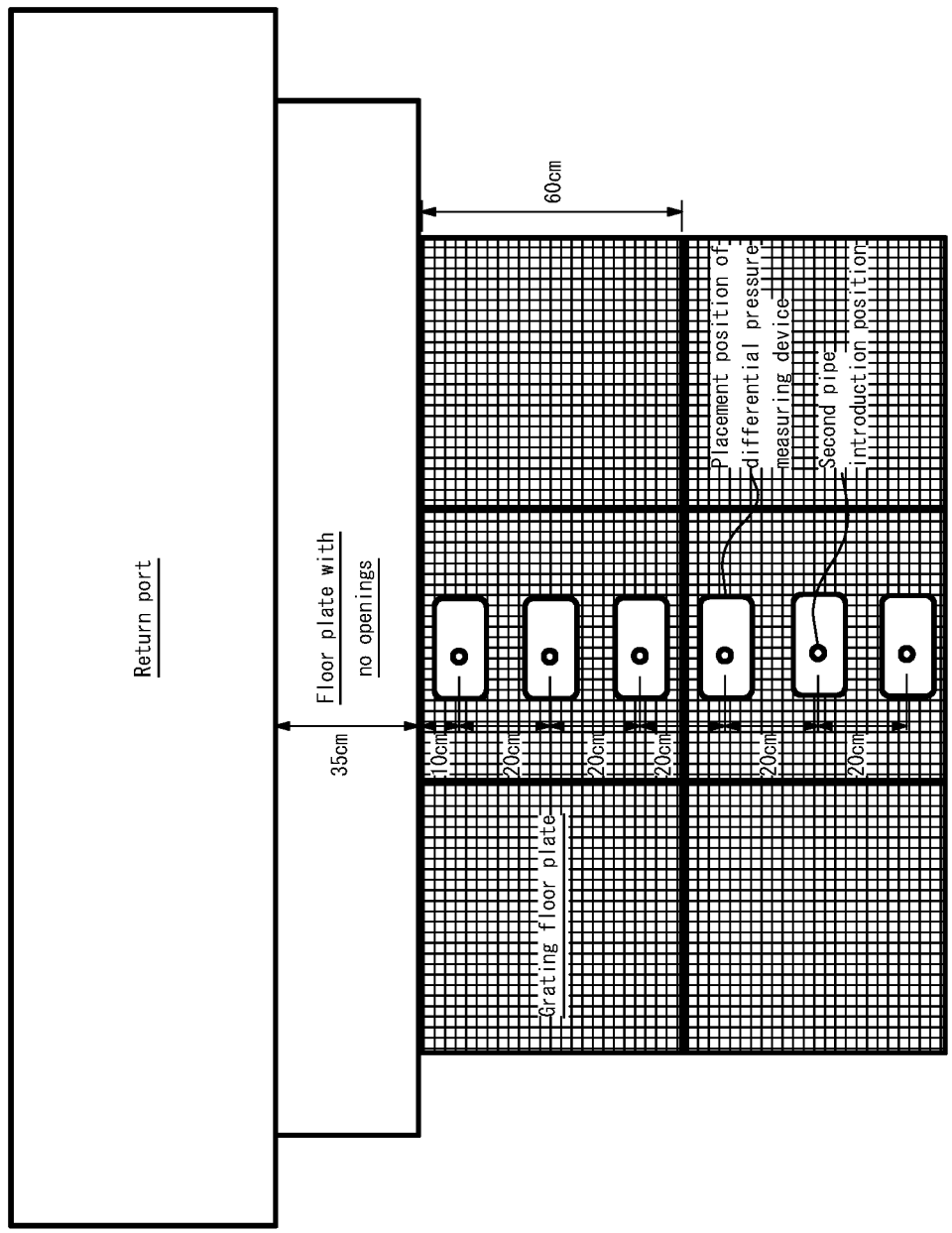
FIG. 4 is a diagram illustrating differential pressure measurement positions in Examples.

Using the differential pressure measuring device 1 in which the distance from the return port 103 was varied as depicted in FIG. 4, the differential pressure between the pressure in the on-floor area 100c and the pressure in the under-floor area 100d was measured. The results are given in FIG. 5.

Comparative Example

As in Invention Example, the differential pressure between the pressure in the on-floor area 100c and the pressure in the under-floor area 100d was measured. A differential pressure measuring device used was the differential pressure measuring unit 11 of the differential pressure measuring device 1 depicted in FIG. 2 in which the first pipe 12 was not connected to the first port 11a, and the second pipe 13 (length: 500 mm) was connected to the second port 11b; and the other end 13b of the second pipe 13 was introduced into the under-floor area 100d through the openings 102a in the grating floor plate 102 in the measurements. All the other conditions were the same as those in Invention Example.

Figure 5:
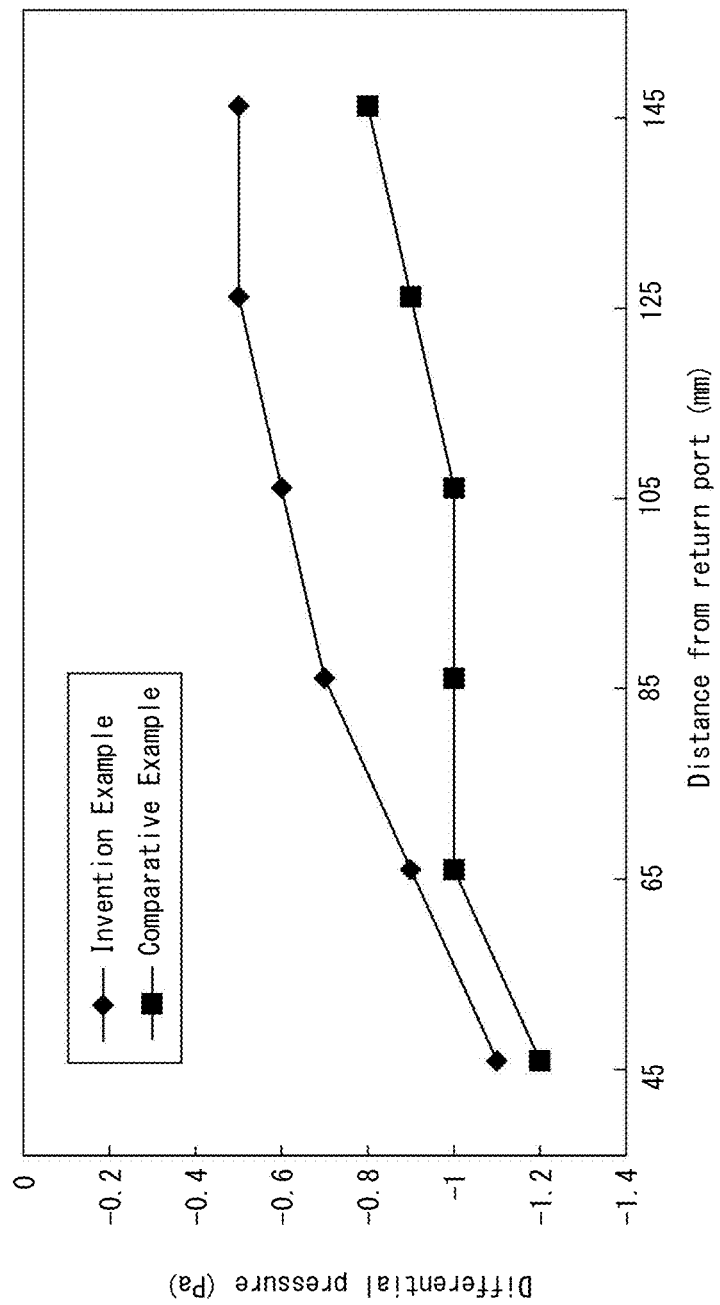
FIG. 5 is a diagram illustrating the relationship between the differential pressure measurement position and the measured differential pressure in Invention Example and Comparative Example.

FIG. 5 illustrates the relationship between the differential pressure measurement position and the measured differential pressure in Invention Example and Comparative Example. As is apparent from FIG. 5, in Invention Example, the differential pressure was smaller as the position of measurement of differential pressure was away from the return port. By contrast, it was found that in Comparative Example, when the position of the other end 13b of the second pipe from the return port 103 was 65 cm to 105 cm, the differential pressure was fixed, and the differential pressure was not accurately measured.

INDUSTRIAL APPLICABILITY

This disclosure makes it possible to measure the difference between the pressure in an on-floor area and the pressure in an under-floor area even when the differential pressure is small, and thus is useful in the semiconductor industry.

REFERENCE SIGNS LIST

1: Differential pressure measuring device
11: Differential pressure measuring unit 12: First pipe
12a: One end of first pipe
12b: Other end of first pipe
13: Second pipe
13a: One end of second pipe
13b: Other end of second pipe
14: Cup
14a: Rim portion
15: Gasket
100: Clean room
100a: Ceiling area
100b: Floor
100c: On-floor area
100d: Under-floor area
101: Clean air supply unit
102: Grating floor plate
102a: Opening
103: Return port
104: Blast fan

The invention claimed is:

1. A differential pressure measuring device measuring a differential pressure between a pressure in an on-floor area in a room in which a grating floor plate is placed and a pressure in an under-floor area in the room, comprising:
   a differential pressure measuring unit having a first port acquiring a pressure in the on-floor area, a second port acquiring a pressure in the under-floor area, a first pipe of which one end is connected to the first port, and a second pipe of which one end is connected to the second port; and
   a cup to which an other end of the second pipe is connected and which forms a space for measuring the pressure in the under-floor area between the cup and the grating floor plate when the cup is placed on the grating floor plate,
   wherein a distance in a device height direction between an other end of the first pipe and the other end of the second pipe is fixed.

2. The differential pressure measuring device according to claim 1, wherein the distance in the device height direction between the other end of the first pipe and the other end of the second pipe is 0 mm or more and 250 mm or less.

3. The differential pressure measuring device according to claim 1, wherein the other end of the first pipe points in a direction crossing the device height direction.

4. The differential pressure measuring device according to claim 1, further comprising a cover inhibiting an air current from flowing to the other end of the first pipe.

5. A differential pressure measurement method comprising:
   placing the differential pressure measuring device according to claim 1 on a grating floor plate placed on a floor in a room; and
   measuring a differential pressure between a pressure in an on-floor area and a pressure in an under-floor area.

6. The differential pressure measuring device according to claim 2, wherein the other end of the first pipe points in a direction crossing the device height direction.

7. The differential pressure measuring device according to claim 2, further comprising a cover inhibiting an air current from flowing to the other end of the first pipe.

8. The differential pressure measuring device according to claim 3, further comprising a cover inhibiting an air current from flowing to the other end of the first pipe.

9. A differential pressure measurement method comprising:
   placing the differential pressure measuring device according to claim 2 on a grating floor plate placed on a floor in a room; and
   measuring a differential pressure between a pressure in an on-floor area and a pressure in an under-floor area.

10. A differential pressure measurement method comprising:
    placing the differential pressure measuring device according to claim 3 on a grating floor plate placed on a floor in a room; and
    measuring a differential pressure between a pressure in an on-floor area and a pressure in an under-floor area.

11. A differential pressure measurement method comprising:
    placing the differential pressure measuring device according to claim 4 on a grating floor plate placed on a floor in a room; and
    measuring a differential pressure between a pressure in an on-floor area and a pressure in an under-floor area.

12. A differential pressure measurement method comprising:
    placing the differential pressure measuring device according to claim 6 on a grating floor plate placed on a floor in a room; and
    measuring a differential pressure between a pressure in an on-floor area and a pressure in an under-floor area.

13. A differential pressure measurement method comprising:
    placing the differential pressure measuring device according to claim 7 on a grating floor plate placed on a floor in a room; and
    measuring a differential pressure between a pressure in an on-floor area and a pressure in an under-floor area.

14. A differential pressure measurement method comprising:
    placing the differential pressure measuring device according to claim 8 on a grating floor plate placed on a floor in a room; and
    measuring a differential pressure between a pressure in an on-floor area and a pressure in an under-floor area.

15. The differential pressure measuring device according to claim 1, wherein a gasket is provided along a rim portion of the cup.

16. The differential pressure measuring device according to claim 1, wherein a rim portion of the cup is not placed on an opening in the grating floor plate.

17. The differential pressure measuring device according to claim 15, wherein the rim portion of the cup is not placed on an opening in the grating floor plate.

18. A differential pressure measurement method comprising:
    placing the differential pressure measuring device according to claim 15 on a grating floor plate placed on a floor in a room; and
    measuring a differential pressure between a pressure in an on-floor area and a pressure in an under-floor area.

19. A differential pressure measurement method comprising:
    placing the differential pressure measuring device according to claim 16 on a grating floor plate placed on a floor in a room; and
    measuring a differential pressure between a pressure in an on-floor area and a pressure in an under-floor area.

20. A differential pressure measurement method comprising:
- placing the differential pressure measuring device according to claim 17 on a grating floor plate placed on a floor in a room; and
- measuring a differential pressure between a pressure in an on-floor area and a pressure in an under-floor area.

* * * * *